United States Patent [19]

Oku et al.

[11] Patent Number: 4,805,040

[45] Date of Patent: Feb. 14, 1989

[54] DROP-OUT CORRECTION CIRCUIT IN AN APPARATUS FOR CORRECTING TIME BASE ERROR WITH INHIBITION OF TIME-BASE INFORMATION DURING DROPOUT

[75] Inventors: Masuo Oku, Kamakura; Yoshimichi Kudo; Isao Saito, both of Yokohama; Yukio Fukui, Machida, all of Japan

[73] Assignee: Hitachi, Ltd., Tokyo, Japan

[21] Appl. No.: 76,070

[22] Filed: Jul. 21, 1987

[30] Foreign Application Priority Data

Jul. 22, 1986 [JP] Japan .................................. 61-170898

[51] Int. Cl.[4] .......................... H04N 5/94; H04N 5/95
[52] U.S. Cl. .................................. 358/336; 358/337; 360/36.1; 360/38.1
[58] Field of Search ............... 358/310, 314, 320, 321, 358/323, 327, 335, 336, 337, 338, 339, 148, 150; 360/33.1, 36.1, 36.2, 38.1

[56] References Cited

U.S. PATENT DOCUMENTS

| 4,021,852 | 5/1977 | Hurst et al. ........................ 358/336 |
| 4,119,812 | 10/1978 | Fox ................................ 358/336 X |
| 4,157,567 | 6/1979 | Scholz .............................. 358/336 |
| 4,158,855 | 6/1979 | Thomas et al. ................. 358/336 X |
| 4,212,027 | 7/1980 | Lemoine . | |
| 4,287,529 | 9/1981 | Tatami et al. ....................... 358/320 |
| 4,393,419 | 7/1983 | Arai et al. ........................ 358/314 X |
| 4,409,627 | 10/1983 | Eto et al. ....................... 358/336 X |
| 4,477,842 | 10/1984 | Kaneko ............................. 358/336 |
| 4,499,570 | 2/1985 | Schouhamer Immink et al. ................................... 358/336 X |
| 4,577,236 | 3/1986 | Takanashi ..................... 358/337 X |
| 4,591,898 | 5/1986 | deBoer et al. ................. 360/38.1 X |
| 4,594,616 | 6/1986 | Dischert ........................ 358/337 X |
| 4,599,649 | 7/1986 | Funai ............................... 358/148 |
| 4,599,650 | 7/1986 | Wilkinson ....................... 358/148 |
| 4,628,371 | 12/1986 | Kuroda ............................ 360/38.1 |
| 4,631,600 | 12/1986 | Fukui ............................ 358/337 X |
| 4,672,474 | 6/1987 | Rodal ............................. 358/336 X |
| 4,680,651 | 7/1987 | Blessinger ...................... 358/336 X |
| 4,686,583 | 8/1987 | Tomita et al. ....................... 358/336 |
| 4,688,081 | 8/1987 | Furuhata et al. ............... 358/337 X |

Primary Examiner—Raymond F. Cardillo
Assistant Examiner—W. R. Young
Attorney, Agent, or Firm—Antonelli, Terry & Wands

[57] ABSTRACT

Time base fluctuation of a video signal reproduced from a video disc or tape is detected and corrected. Meanwhile, a dropout of such reproduced video signal is also detected. The dropout detection signal thus obtained represents the dropout period during which the time base information is erroneous. Therefore the time base information detected during such dropout period is rendered invalid to consequently eliminate erroneous correction of the time base fluctuation.

3 Claims, 4 Drawing Sheets

DROP-OUT CORRECTION CIRCUIT IN AN APPARATUS FOR CORRECTING TIME BASE ERROR WITH INHIBITION OF TIME-BASE INFORMATION DURING DROPOUT

BACKGROUND OF THE INVENTION

1. Field of the Invention

The present invention relates to a video signal reproducing apparatus such as a video disc player or a video tape recorder and, more particularly, to a time base correcting circuit designed for correction of time base fluctuation in a reproduced video signal.

2. Description of the Prior Art

In a video signal reproduced by a video disc player or a video tape recorder, there occurs a time base fluctuation called jitter that results from the mechanical precision of a recording medium, a rotary mechanism and so forth, hence causing some deterioration of the picture quality such as instability of the picture on a screen.

Furthermore, there also occurs in the video signal a dropout with absence of information due to foreign particles such as dust deposited on a recording medium or some other fault thereof, whereby the picture quality is deteriorated in this case as well.

In order to avert such a trouble, the video disc player or video tape recorder is generally equipped with a jitter correcting means and a dropout correcting means to process the reproduced video signal properly, thereby preventing the above-mentioned deterioration of the picture quality.

Although jitter correction may be executed by mechanically vibrating a signal detector through the use of an actuator, it is customary to adopt an electrical method employing an IC memory, as disclosed in U.S. Pat. No. 4,212,027.

As regards the means for dropout correction, there is known a method which first detects a dropout period by sensing the pulse duration of a reproduced signal (usually frequency-modulated signal) obtained from the signal detector or by sensing the reduction of the signal envelope, and then replaces the signal during such dropout period with a closely correlated signal preceding by one horizontal scanning interval.

In the above jitter correcting means of the prior art employing an IC memory, the reproduced video signal needs to be converted from an analog form to a digital one so as to be processed as a digital signal. Therefore, when using such jitter correcting means in combination with the dropout correcting means, a remarkable advantage is attainable with respect to both the circuit configuration and the performance if the replacement with a signal preceding by one horizontal scanning interval is executed in the form of a digital signal in the dropout correcting means.

As a result of studying the system that uses such two means in combination, the present inventors have found the following. Since jitter information required for jitter correction is detected from the video signal prior to dropout correction, there exists a problem that erroneous detection of the jitter information is prone to be executed to bring about malfunction of the jitter corrector, and such malfunction generates local skew on a screen to eventually cause considerable deterioration of the picture quality.

As the sampling in analog-to-digital signal conversion needs to be executed in the stage where the signal still has the jitter, the aforesaid jitter information is exactly required for such analog-to-digital conversion, so that it becomes necessary to detect the jitter information in a stage prior to analog-to-digital conversion. However, in case dropout correction is performed digitally as mentioned above, it follows that the dropout corrector is disposed in a stage following the analog-to-digital conversion, whereby detection of the jitter information should be executed inevitably from the video signal prior to dropout correction.

SUMMARY OF THE INVENTION

The present invention has been accomplished in an attempt to solve the above problems observed in the prior art. And its object resides in providing a time base correcting circuit which is capable of executing proper jitter correction through detection of the jitter information even from the video signal prior to drop-out correction while eliminating the possibility that jitter correction is carried out on the basis of erroneous jitter information with dropout.

In order to achieve the object mentioned, the present invention is so contrived that a dropout pulse obtained as an output signal from a dropout detector is fed to a jitter information detector, where the detected jitter information is rendered invalid by such dropout pulse during the dropout period.

DESCRIPTION OF THE PREFERRED EMBODIMENTS

Hereinafter preferred embodiments of the present invention will be described with reference to the accompanying drawings.

Figure 1:
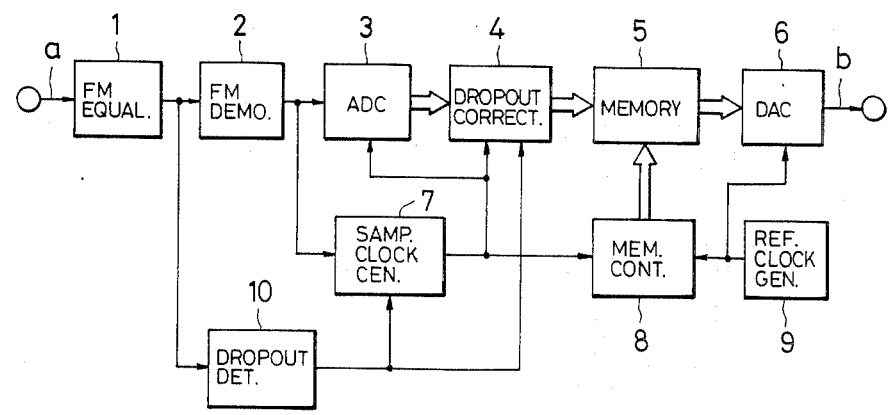
FIG. 1 is a block diagram of a first embodiment of the present invention.

FIG. 1 is a block diagram of a first embodiment of the invention, which comprises an FM equalizer 1, an FM demodulator 2, an analog-digital converter (ADC) 3, a dropout corrector 4, a memory 5, a digital-analog converter (DAC) 6, a sampling clock generator 7, a memory controller 8, a reference clock generator 9, and a dropout detector 10. In this diagram, a and b represent a reproduced FM signal from a signal detector (not shown) and a reproduced video signal, respectively.

The reproduced FM signal a is fed to the FM equalizer 1 for adequate frequency response compensation to prevent inversion and so forth, and then is inputted to both the FM demodulator 2 and the dropout detector 10. In the detector 10, any dropout of the input FM signal is detected. This step may be carried out by detecting the reduction of the envelope or detecting the pulse duration of the FM signal as will be described later. A combination thereof may be employed as well.

The output of the dropout detector 10 is fed to both the sampling clock generator 7 and the dropout corrector 4 as a dropout pulse representative of the dropout period.

The sampling clock generator 7 produces a first clock signal for sampling and digitizing, through the ADC 3, the video signal demodulated in the FM demodulator 2. In this stage, a first clock signal following the jitter of the video signal is produced from the horizontal sync signal or burst signal of the video signal by the use of a known phase-locked loop (PLL) circuit or the like. A detailed description will be given later with regard to the operation of the sampling clock generator 7 performed in response to the dropout pulse.

In the dropout corrector 4, the noise resulting from any dropout is replaced with a closely correlated signal, which is preceding by one horizontal scanning interval for example, in response to the input dropout pulse so that the dropout noise is rendered inconspicuous on the screen.

The memory 5 serves to correct the jitter corresponding to fluctuation of the time base. Writing in the memory 5 is executed according to the aforesaid first clock signal, while reading therefrom is executed according to a jitterless stable second clock signal which is obtained from the reference clock generator 9 and is therefore free from any time base fluctuation. The memory 5 is controlled through the memory controller 8 which feeds a write address signal, a read address signal or a write permit signal to the memory 5.

In the DAC 6, the digital data read out from the memory 5 is converted into an analog form again so that a jitter-corrected video signal is obtained.

The above is the general operation performed in this embodiment.

Now a detailed description will be given on the operation of the sampling clock generator 7 which is a principal component of the present invention, particularly on the operation performed in response to an input dropout pulse.

Figure 2:
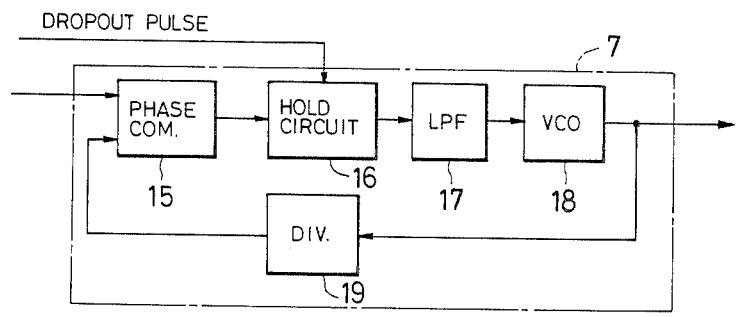
FIGS. 2 and 3 are block diagrams of exemplary constitutions of a sampling clock generator shown in FIG. 1.

FIG. 2 is a block diagram showing an exemplary constitution of the sampling clock generator in FIG. 1.

In this diagram, there are shown a phase comparator 15, a hold circuit 16, a low-pass filter (LPF) 17, a voltage-controlled oscillator (VCO) 18, and a frequency divider 19.

In FIG. 2, one input to the phase comparator 15 is a signal having the time base information of the reproduced video signal, such as a horizontal sync signal obtained by sync separation or a burst pulse obtained by detecting a specific phase of the burst signal. The circuit for such sync separation or specific phase detection is not shown in FIGS. 1 and 2.

The phase comparison output from the phase comparator 15 serves to drive the VCO 18 via the hold circuit 16 and the LPF 17. The output of the VCO 18 is fed as another input to the phase comparator 15 via the frequency divider 19. In this constitution, the sampling clock generator 7 forms a PLL circuit.

Accordingly, the first clock signal outputted from the VCO 18 is synchronized with the horizontal sync signal or burst pulse inputted to the phase comparator 15, hence becoming a signal which follows the jitter of the reproduced video signal.

Meanwhile, the aforesaid input dropout pulse is fed to the hold circuit 16. Upon sensing the dropout period in response to the dropout pulse, the hold circuit 16 is placed in a preceding-value holding state during such period to keep outputting the phase comparison signal inputted thereto immediately before occurrence of the dropout.

Thus, the information of erroneous phase comparison induced by dropout noise and obtained from the phase comparator 15 is not transmitted to the VCO 18, so that any erroneous jitter information due to the dropout is not included in the first clock signal outputted from the VCO 18, whereby normal jitter correction can be executed continuously in the memory 5 shown in FIG. 1.

Figure 3:
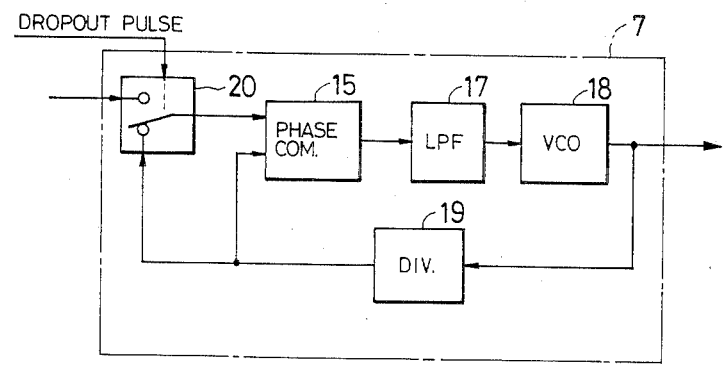

FIG. 3 is a block diagram showing another exemplary constitution of the sampling clock generator in FIG. 1.

In this diagram, the same components as those used in FIG. 2 are denoted by the same reference numerals, and shown at 20 is a switch.

In FIG. 3, the switch 20 is employed in place of the hold circuit 15 used in FIG. 2. The phase comparator 15 is such that its output has a high impedance when two inputs thereto are in phase (e.g. TC5081AP made by Toshiba).

In the sampling clock generator 7 of FIG. 3, the switch 20 is changed by the dropout pulse so that the output of the frequency divider 19 is fed to two inputs of the phase comparator 15 during the dropout period, whereby the phase comparator 15 is made to have a high-impedance output and is therefore furnished equivalently with the same function as that of the hold circuit 16 shown in FIG. 2.

The above description is concerned with the sampling clock generator which serves as a principal component of the present invention.

Now exemplary circuit configurations of the dropout corrector 4 and the dropout detector 10 will be described below.

Figure 4:
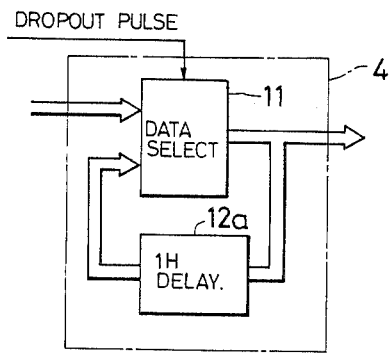
FIGS. 4 and 5 are block diagrams of exemplary constitutions of a dropout corrector shown in FIG. 1.
Figure 5:
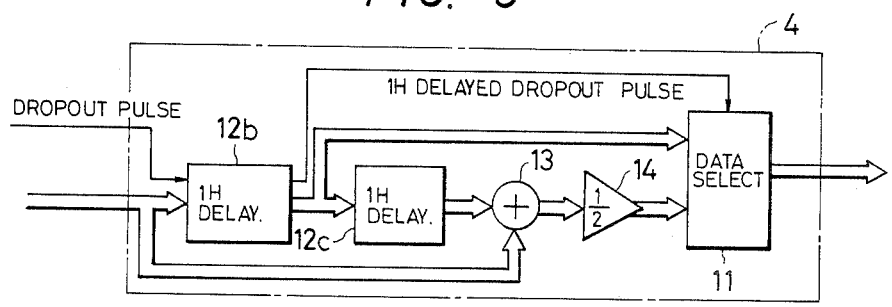

FIGS. 4 and 5 are block diagrams each showing an exemplary constitution of the dropout corrector 4 in FIG. 1. In these diagrams, there are included a data selector 11, delay circuits 12a, 12b, 12c for delaying the video signal by one horizontal scanning interval (1H) respectively, an adder 13, and a multiplier 14.

In the constitution of FIG. 4, the dropout pulse is fed directly to the data selector 11 so that its output signal is selected. Normally the input video signal thereto is outputted without any change, but during the dropout period, it is replaced with a 1H delayed video signal.

Since such signal replacement is performed cyclically in this constitution, there exists an advantage that a satisfactory result is achievable if the dropout period is as long as several horizontal scanning intervals.

In the constitution of FIG. 5, two 1H delay circuits 12b and 12c are employed to execute signal replacement by linear approximation using signals of prior and subsequent scanning lines, so that adequate replacement can be attained even in a portion where abrupt variation is present particularly in the direction vertical to the drawing paper face.

In this embodiment, the dropout pulse is fed to the 1H delay circuit 12b together with the digital data of the video signal. Since the center of the video signal deviates by 1H due to linear approximation, the data selector 11 switches the 1H delayed video signal and the replacement signal in response to the 1H delayed dropout pulse. The replacement signal is an arithmetic average of the 2H delayed signal obtained as an output of the 1H delay circuit 12c and the input nondelayed signal.

Figure 6:
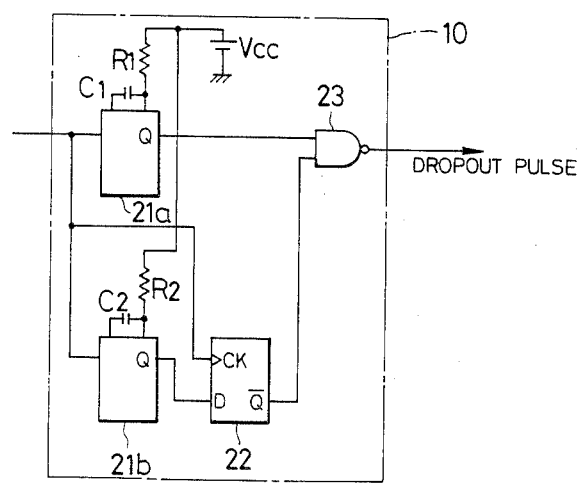
FIG. 6 is an exemplary circuit diagram of a dropout detector shown in FIG. 1.

FIG. 6 is an exemplary circuit diagram of the dropout detector 10 shown in FIG. 1.

Generally the allowable frequency range of the FM signal a to be reproduced is predetermined by a signal format. Therefore, by discriminating whether the input FM signal is within such predetermined frequency range or not, it becomes possible to judge that the input FM signal is in a normal state in the former case. If the signal is out of such frequency range, it signifies occurrence of a dropout.

Utilizing the above, the dropout detector 10 of FIG. 6 is equipped with a retriggerable monostable multivibrator (MMV) to discriminate, instead of detecting the frequency, whether the pulse duration of the FM signal is within its predetermined frequency range or not, thereby detecting a dropout.

In FIG. 6, there are shown MMVs 21a and 21b, a D-flip flop (D-FF) 22, and a NAND gate 23.

In the MMV 21a, its time constant C1 R1 is so selected that the output pulse duration becomes slightly longer than the predetermined maximum pulse duration of the FM signal. As a result, when the FM signal is fed normally, the MMV 21a is continuously retriggered as known so that its output Q is maintained at a high level. However, if the FM signal is absent, the pulse duration is changed to be longer than the normal maximum pulse duration, whereby the MMV 21a is released from the retriggered state to turn its output Q to a low level, and thus the absence of the FM signal can be detected as a dropout.

Meanwhile in another MMV 21b, its time constant C2 R2 is so selected that the output pulse duration becomes slightly shorter than the prescribed minimum pulse duration of the FM signal. As a result, a pulse signal of a fixed pulse duration triggered by the edge of the FM signal appears in the output Q of the MMV 21b, and then the D-FF 22 detects the logic level of such pulse signal synchronously with the same edge of the FM signal. Accordingly, when the FM signal is normal, the pulse signal is detected in a low-level state. However, in case the FM signal has a higher frequency and a shorter pulse duration as compared with its normal values due to superposition of noise and so forth, the MMV 21b is retriggered so that its output Q is maintained at a high level. Consequently the D-FF 22 detects a high level representing a dropout which shortens the pulse duration of the FM signal.

The NAND gate 23 combines the two dropout detection signals with each other to produce a dropout pulse.

Depending on the characteristic of the dropout from a recording medium, the dropout detector 10 may be composed of the aforesaid MMV 21a alone for detecting merely the dropout which widens the pulse duration of the FM signal.

Thus, according to the embodiment mentioned above, any malfunction of the jitter corrector that may result from noise including dropout can be remarkably reduced by rendering the erroneous jitter information invalid during the dropout period in response to a dropout pulse.

Figure 7:
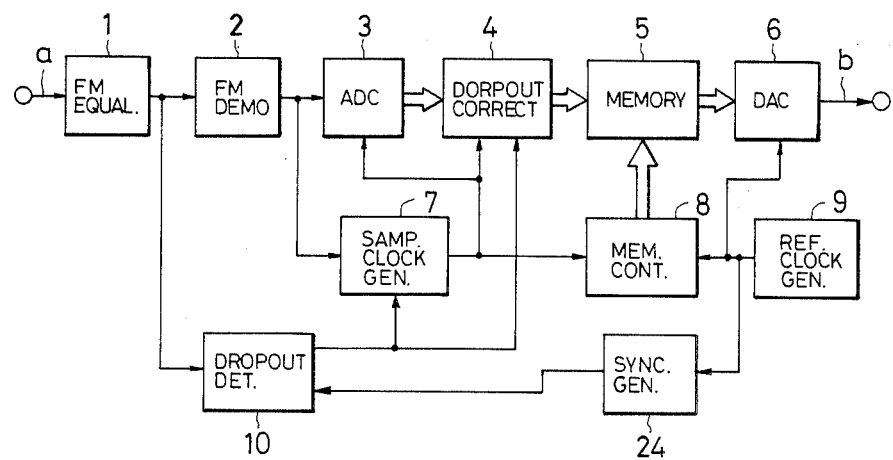
FIG. 7 is a block diagram of a second embodiment of the present invention.

FIG. 7 is a block diagram of a second preferred embodiment of the present invention.

In this embodiment, the same components as those used in the first embodiment are denoted by the same reference numerals, and a difference resides in the additional provision of a sync signal generator 24.

The operation is mostly similar to that in the first embodiment with the exception that an H blanking signal representing a horizontal blanking period is fed from the sync signal generator 24 to the dropout detector 10 and, during such blanking period, the detecting means in the dropout detector 10 or the detection characteristic thereof is selectively changed.

The video signal in one horizontal scanning interval can be divided into a horizontal blanking period including a horizontal sync signal and a burst signal, and a picture signal period including a luminance signal and a chrominance signal. In contrast with the picture signal period where there exist sharp signal changes from white to black and vice versa, signal changes are not so sharp in the horizontal blanking period. This signifies that, in the video signal processed as an FM signal, the momentary frequency (reciprocal of pulse duration) changes merely within a narrow range in the horizontal blanking period while its change extends over a wide frequency range in the video signal period.

Accordingly, the allowable frequency range of the video signal prescribed by the aforementioned signal format becomes different in the horizontal blanking period and the picture signal period. For example, in comparison with the picture signal period where the frequencies are prescribed within a range of f1-f2, the frequencies in the horizontal blanking period are prescribed within a narrower range of f1'-f2' (where f1≦f1'<f2'≦f2).

Therefore, relative to the dropout detection executed in the dropout detector 10 by discriminating whether the input FM signal is within a frequency range of f1-f2 (dropout is judged to be present when the signal is out of such frequency range as described previously), the operation is switched to discriminate whether the signal is within a frequency range of f1'-f2' merely during the horizontal blanking period, thereby substantially extending the dropout detection range in the horizontal blanking period to eventually increase the detection accuracy. As a result, it becomes possible to attain almost complete elimination of malfunction in the jitter correction.

The means for generating an H blanking signal representative of the horizontal blanking period is not limited to the sync signal generator 24 employed in this exemplary embodiment, and such signal may be produced from the horizontal sync signal obtained from the reproduced video signal by sync separation.

Figure 8:
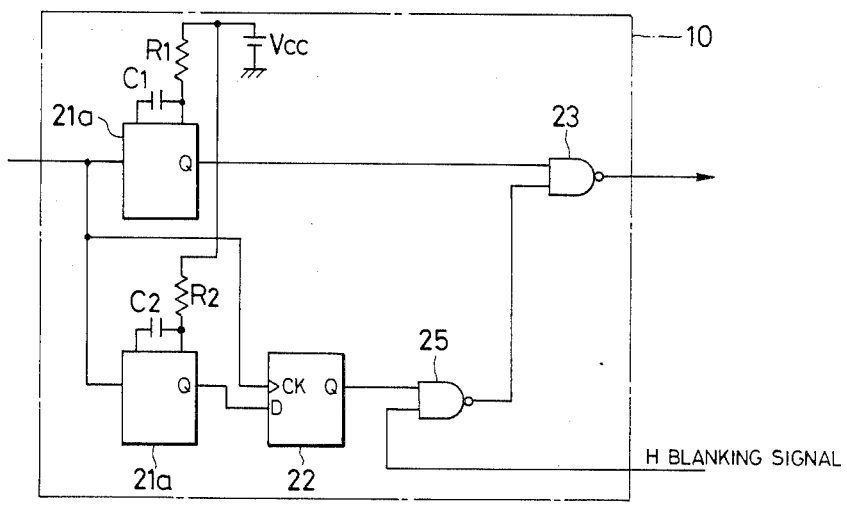
FIGS. 8 and 9 are exemplary circuit diagrams of a dropout detector shown in FIG. 7.
Figure 9:
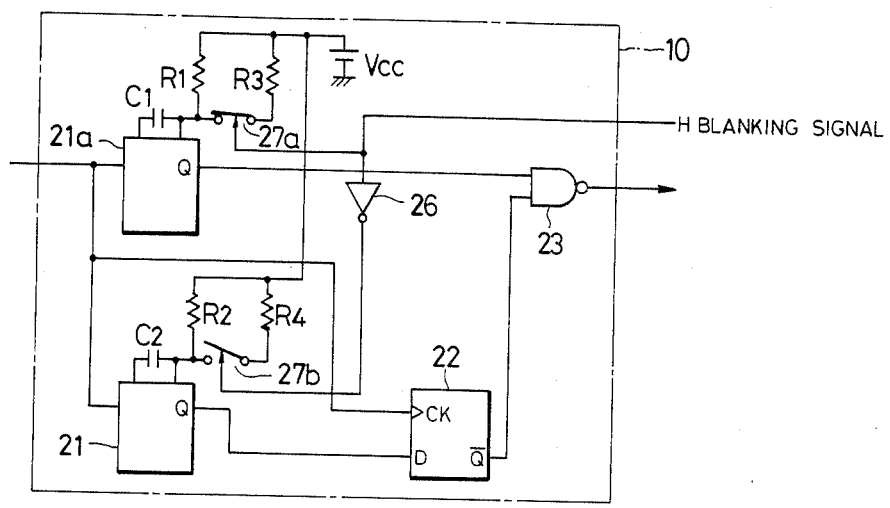

FIGS. 8 and 9 are circuit diagrams showing exemplary configurations of the dropout detector in FIG. 7, wherein the same components as those used in FIG. 6 are denoted by the same reference numerals. And there are further shown a second NAND gate 25, an inverter 26, and switches 27a and 27b.

In the example of FIG. 8, merely the dropout that widens the pulse duration of the FM signal is detected by the MMV 21a in the aforementioned picture signal period, while the dropout that narrows the pulse duration of the FM signal is detected by a combination of the MMV 21b and the D-FF 22 in the horizontal blanking period. The NAND gate 25 renders the output of the D-FF 22 invalid during a high level of the H blanking signal, i.e. during the picture signal period.

In the example of FIG. 9, switches 27a and 27b are actuated by the H blanking signal to change the time constants of the two MMVs 21a and 21b. In the MMV 21a, the time constant is changed from C1 R1 to C1

$$\frac{R1\ R3}{R1 + R3}$$

in the horizontal blanking period for narrowing the detection pulse duration; while in the MMV 21b, the time constant is changed from C2

$$\frac{R2\ R4}{R2 + R4}$$

to C2 R2 for widening the detection pulse duration, so that more accurate dropout detection can be executed in the horizontal blanking period.

It is obvious that the constitution for selectively switching the time constant of each MMV is not limited to the example shown in FIG. 9.

Figure 10:
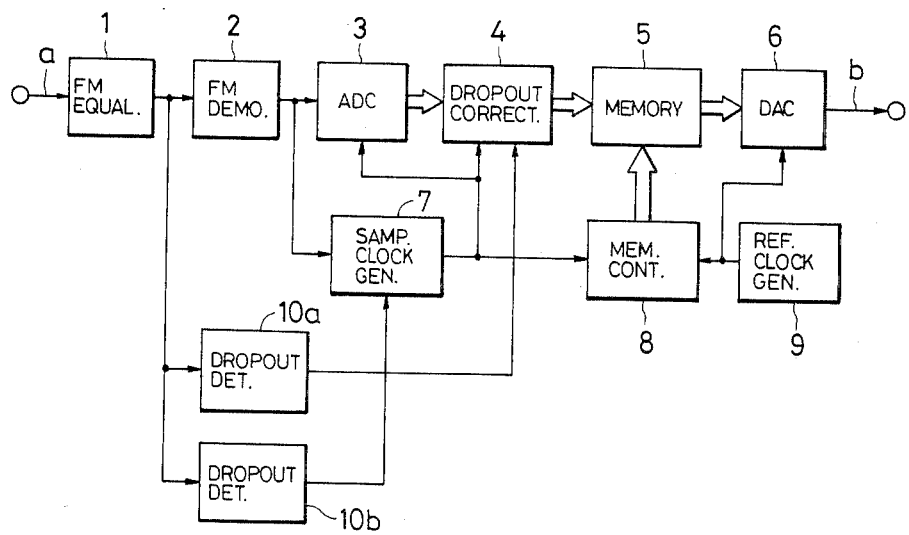
FIG. 10 is a block diagram of a third embodiment of the invention.

FIG. 10 is a block diagram of a third exemplary embodiment of the present invention.

In this embodiment, the same components as those used in the first embodiment of FIG. 1 are denoted by the same reference numerals. As compared with the first embodiment, a difference resides in the provision of two dropout detectors 10a and 10b.

Each of the dropout detectors 10a and 10b may be so constituted as shown in FIG. 6 or such two detectors may have a common portion mutually.

A dropout pulse outputted from the first dropout detector 10a is fed to the dropout corrector 4 so that any noise resulting from the dropout is rendered nonconspicuous on the screen. Therefore the dropout detection range is set on the basis of the aforesaid picture signal.

A dropout pulse outputted from the second dropout detector 10b is fed to the sampling clock generator 7 so as to prevent, for example, the VCO from being driven by erroneous jitter information as described previously. Thus the dropout detector 10b is substantially required to detect merely the dropout in the horizontal blanking period alone, because the horizontal sync signal or burst pulse used in the sampling clock generator 7 as mentioned is not affected at all even when a dropout occurs at any time other than the horizontal blanking period. Accordingly, the dropout detection range is set to be wider than that of another dropout detector 10a on the basis of the horizontal blanking period.

Consequently, in the second and third embodiments, more accurate dropout detection is substantially attainable during the horizontal blanking period which includes the horizontal sync signal or burst signal for detection of jitter information, whereby any malfunction that may result from dropout-induced noise in jitter correction can be eliminated almost completely.

Although the jitter correction in each of the first, second and third embodiments is executed by the use of a digital IC memory, it is to be understood that the jitter correction means relative to the present invention is not limited to the above alone.

For example, the present invention is applicable also to an arrangement where feed-back or feed-forward control is performed with a charge coupled device (CCD) serving as a variable delay line in place of the digital IC memory, or to an arrangement where feed-back control is performed by using the aforementioned actuator.

In the case of employing such CCD or actuator, a driving signal is obtainable as follows. In the circuits of FIGS. 2 and 3, for example, the output of the frequency divider 19 fed to one input of the phase comparator 15 is replaced with a stable reference sync signal which is generated from a separate source and is free from any time base fluctuation, and the CCD is driven by the output of the LPF 17 through the VCO 18 or the actuator is driven directly by the output of the LPF 17.

In detection of the jitter information from the video signal including the dropout-induced noise, since the dropout period is represented by the dropout pulse, the erroneous jitter information detected during such period is rendered invalid by the jitter information detector. Consequently it becomes possible to prevent malfunction of the jitter corrector that may otherwise be caused by the erroneous jitter information.

In a circuit configuration so contrived as to increase the detection accuracy by changing the characteristic of the dropout detecting means in the horizontal blanking period including the horizontal sync signal and burst signal for detection of jitter information, more precise dropout detection is achievable to eliminate malfunction of the jitter corrector further completely.

According to the present invention, as described hereinabove, erroneous jitter information resulting from a dropout is not used for jitter correction even when detection of the jitter information is executed on the basis of the video signal prior to dropout correction, so that it becomes possible to avert malfunction of the jitter corrector that may otherwise be caused by some noise such as dropout, whereby local skew on the screen is preventable to eventually eliminate deterioration of the picture quality.

Furthermore, if the dropout detecting means is so formed that, merely in the horizontal blanking period including a horizontal sync signal and a burst signal used for detection of jitter information, the dropout detection range is set separately on the basis of such signal, then more precise dropout detection is attainable in the above period.

What is claimed is:

1. A time base correcting circuit for a video signal reproducing apparatus, comprising means for detecting dropout in a reproduced video signal received from a recording medium and for producing a dropout signal in response thereto; means for detecting a time base fluctuation of said reproduced video signal in accordance with time base information obtained from said reproduced video signal and for producing a time base signal in response to detection of said time base fluctuation; means for correcting a time base fluctuation of said reproduced video signal using said time base signal; and means responsive to said dropout signal for controlling said time base fluctuation detecting means to maintain said time base signal by rendering said time base fluctuation detecting means non-responsive to said time base information during the detected dropout; further including horizontal blanking signal generating means for generating a horizontal blanking signal; and means for selectively changing a characteristic of said dropout detecting means in response to said horizontal blanking signal representing a horizontal blanking period and obtained from said horizontal blanking signal generating means.

2. A time base correcting circuit for a video signal reproducing apparatus, comprising means for detecting dropout in a reproduced video signal received from a recording medium and for producing a dropout signal in response thereto; means for detecting a time base fluctuation of said reproduced video signal in accordance with time base information obtained from said reproduced video signal and for producing a time base signal in response to detection of said time base fluctuation; means for correcting a time base fluctuation of said reproduced video signal using said time base signal; and means responsive to said dropout signal for controlling said time base fluctuation detecting means to maintain said time base signal by rendering said time base fluctuation detecting means non-responsive to said time base information during the detected dropout; wherein said dropout detecting means comprises a first dropout detector and a second dropout detector having mutually different detection characteristics, a detection signal obtained from said first dropout detector being fed to said time base detecting means, while a detection signal from said second dropout detector is fed to a dropout corrector incorporated in the video signal reproducing apparatus, so that the reproduced video signal is replaced with another signal by said dropout corrector during the detected dropout.

3. A time base correcting circuit for a video signal reproducing apparatus, comprising means for detecting dropout in a reproduced video signal received from a recording medium and for producing a dropout signal in response thereto; means for detecting a time base fluctuation of said reproduced video signal in accordance with time base information obtained from said reproduced video signal and for producing a time base signal in response to detection of said time base fluctuation; means for correcting a time base fluctuation of said reproduced video signal using said time base signal; and means responsive to said dropout signal for controlling said time base fluctuation detecting means to maintain said time base signal by rendering said time base fluctuation detecting means non-responsive to said time base information during the detected dropout; wherein said dropout detecting means comprises a retriggerable monostable multivibrator connected to receive said reproduced video signal and having an output pulse duration which is set to be shorter than a prescribed minimum pulse duration of said reproduced video signal, and means for detecting the logic level of the output of said monostable multivibrator from the rising or falling edge of said reproduced video signal which is triggering said monostable multivibrator, so as to detect when said reproduced video signal becomes shorter than a predetermined pulse duration.

* * * * *